US006696926B2

(12) United States Patent
Tsukamoto et al.

(10) Patent No.: US 6,696,926 B2
(45) Date of Patent: Feb. 24, 2004

(54) AUDIBLE FLOOR CALL RECORDING METHOD AND BRAILLE INFORMATION NOTIFICATION DEVICE

(75) Inventors: Yohsinobu Tsukamoto, Sanbu (JP); Toshirou Takahashi, Kamura (JP); Joji Tanigawa, Kujyukuri (JP)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/086,013

(22) Filed: Feb. 28, 2002

(65) Prior Publication Data

US 2002/0121984 A1 Sep. 5, 2002

(30) Foreign Application Priority Data

Mar. 5, 2001 (JP) .................................. 2001-059636

(51) Int. Cl.[7] .............................................. H04B 3/36

(52) U.S. Cl. .................... 340/407.1; 340/692; 340/540; 340/686.1; 340/454.1; 187/901; 187/391; 187/396

(58) Field of Search .............................. 340/407.1, 692, 340/540, 686.1, 454.1; 187/901, 391, 396

(56) References Cited

U.S. PATENT DOCUMENTS 4,400,787 A * 8/1983 Mandel et al. .............. 340/692
4,683,989 A * 8/1987 Pillage et al. ............... 187/121
6,021,870 A * 2/2000 Kim ........................... 187/247

* cited by examiner

*Primary Examiner*—Jeffery Hofsass
*Assistant Examiner*—Hung Nguyen

(57) ABSTRACT

A method for inputting a voice message recording for a particular floor served by an elevator car includes the steps of sensing elevator car positions (21), sensing that a selected car operating panel button has been held down (22) and enabling a voice input process (23). A device for displaying Braille information to an elevator user includes an elongated panel (42) having a central Braille character panel (31) and two buttons (32, 33) disposed at opposite ends of the elongated panel for causing the displayed information to move backward and forward. A plurality of actuators (38), and probes (35) extruding through the Braille panel form Braille characters.

2 Claims, 3 Drawing Sheets

FIG.3
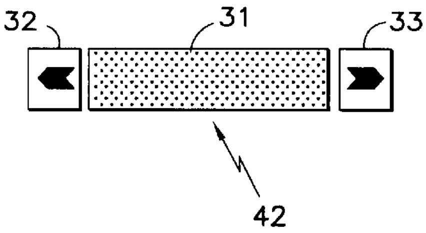
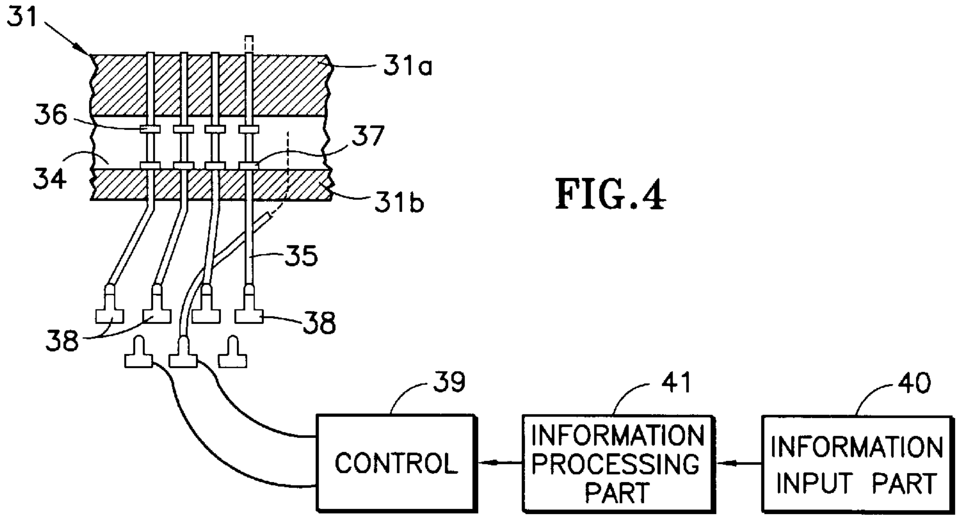
FIG.4
FIG.5
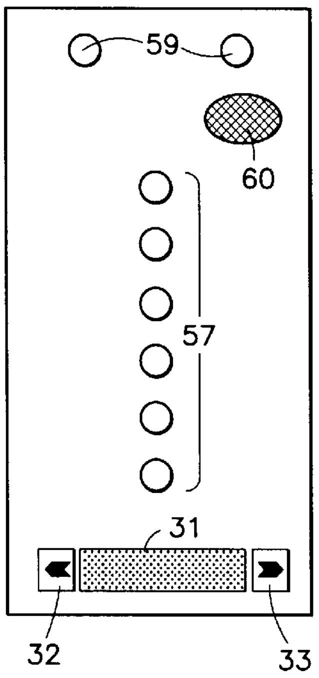

AUDIBLE FLOOR CALL RECORDING METHOD AND BRAILLE INFORMATION NOTIFICATION DEVICE

TECHNICAL FIELD OF THE INVENTION

The present invention pertains to a method for recording an audible floor call for any floor in an elevator and a Braille information notification device by which guiding information on any floor is notified by means of Braille.

BACKGROUND

In the past, when a visually handicapped person used an elevator, he/she either read Braille notices located near the floor buttons on the elevator car operating panel in the elevator or the elevator hall in order to actuate the button for the target floor, or utilized an audio information guide. In addition, a system for issuing an audible floor announcement as the elevator car arrived at each floor has been adopted. FIG. 7 is a diagram showing a schematic configuration of said audible floor announcement system. In said system, recording means 53 is provided on control board 52 placed on the back of the operating panel (not illustrated) in elevator car 51, and a signal 54, triggered by the arrival of the elevator car at a given floor is delivered to said recording means 53, and the floor at which elevator car 51 has arrived is announced by a voice from speaker 55.

In the case of the typical floor call sound notification system shown in FIG. 7, because Braille plates 58 are merely attached near floor buttons 57 on operating panel 56 (shown in FIG. 8) of elevator car 51, the Braille information is limited only to the areas of Braille plates 58, so that the amount of information to be conveyed is limited. Furthermore, in FIG. 8, door OPEN/CLOSE buttons 59 and speaker 60 are provided on operating panel 56.

It is known in the prior art to provide a system wherein to operating panel 56 in a handicapped person presses elevator STOP button and remains in touch with a reconfigureable Braille display provided near said button with his finger, as the elevator car passes the floors. As said car passes the floors, said passing floors are indicated by means of Braille, so that the handicapped person can find the traveling status of the car. Thus, the handicapped person can remain at ease while waiting to arrive at his/her destination floor.

However, the invention described in said patent is intended to convey Braille information, only regarding floor number to handicapped people, and the space for the Braille display part needs to be increased if a larger amount of information is to be provided. In addition, because audible floor calls are limited to messages preset by the manufacturer, it is inconvenient in that audible calls cannot be changed as desired.

The present invention was achieved in light of the aforementioned situation, and its objective is to present an audible floor call registration method and a Braille information notification device by which not only the individual floor messages can be changed easily, but the amount of Braille information to be conveyed can also be increased significantly.

DISCLOSURE OF THE INVENTION

In order to achieve the aforementioned objective, in the present invention, a first embodiment is characterized as being provided with an elevator car position sensing process in which an elevator car is moved to a floor where an original voice is to be input, and whether the elevator car has arrived at said floor or not is sensed;

- a continuous button holding-down judging process in which, after the arrival of the elevator car at the aforementioned floor is sensed through said position sensing process, whether a first button preset on an operating panel provided in the elevator car has been held down for a fixed duration of time or not is judged;
- a voice input enabling process in which when the first button, through said continuation judging process, is judged to have been held down, a voice input is enabled;
- a recording starting process in which when a second button on the aforementioned operating panel is actuated, a recording of a given message is started; and
- a voice input setting ending process in which when a third button on the aforementioned operating panel is actuated, the aforementioned message is recorded, and the aforementioned operation is ended.

A second embodiment of the present invention is characterized as being a panel presenting information in Braille, wherein said Braille information panel is equipped with a slender rectangular Braille character panel provided in the center and buttons provided on the left and the right of said Braille character panel in order to move the Braille information presented on the Braille character panel backward or forward.

The second is embodiment is further characterized in that the aforementioned Braille character panel is configured with an upper and a lower panel layer, a fixed space is provided between the layers, the layers are pierced with multiple probes used to form Braille characters, said probes are provided with upper limit stops and lower limit stops, each probe is configured such that it can be moved vertically, actuators are controlled by means of output processed by an information processing part according to input information from an information input part, and the probes move up and down to create Braille characters in accordance with said control.

BRIEF DESCRIPTION OF THE FIGURES

FIG. 3 is a diagram for explaining the configuration of a second embodiment of the present invention.

FIG. 4 is a diagram for explaining the details of the Braille character driving mechanism.

FIG. 5 is a diagram for explaining a configuration when the Braille character panel is provided on the operating panel in the elevator car.

BEST MODE

Embodiments of the present invention will be explained below based on figures.

First Embodiment

Figure 1:
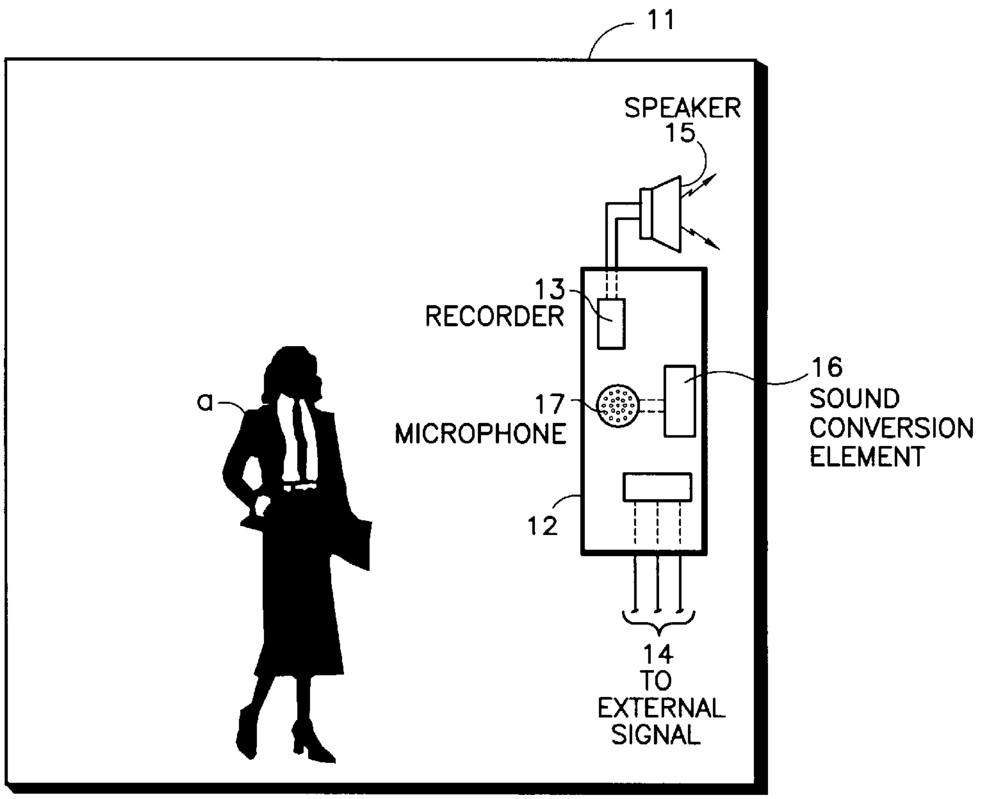
FIG. 1 is a diagram showing an outlined configuration of a first embodiment of the present invention.
Figure 2:
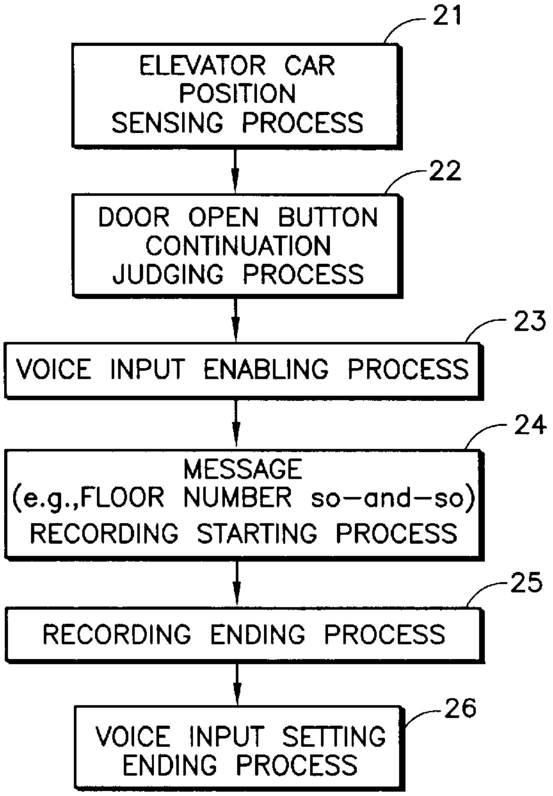
FIG. 2 is a block diagram of the first embodiment.

FIG. 1 is a diagram showing an outlined configuration of a first embodiment of said invention, and FIG. 2 is a functional block diagram of the first embodiment. In FIG. 1, 11 is an elevator car, and control board 12 is provided on the back of an operating panel (not illustrated) in said elevator car 11. Said control board 12 is provided with a recorder 13 in which information for notifying each floor at which the elevator car has just arrived by voice is stored. When an elevator car arrival signal as external signal 14 is input into said recorder 13, recorder 13 interprets said signal, retrieves the voice information for the floor at which elevator car (11) has just arrived, and outputs said information from speaker 15 as a voice for the purpose of notification.

Control board 12 of elevator car 11 is provided with sound conversion element 16, so that during setup operations when an operator says "Floor number so-and-so" into microphone 17 provided on the operating panel, the resulting electric signal is input into said sound conversion element 16. Output of sound conversion element 16 is supplied to recorder 13 and stored there. Furthermore, because an indicator panel for sound input/output setup operations cannot be easily provided on the operating panel, door OPEN/CLOSE buttons and floor buttons on the operating panel are assigned as buttons for "Play: P (PLAY), Redo: R (REPEAT), Delete: D (DELETE), and Record: S (SOUND)" and these assigned buttons are designed to flash during setup operation mode.

Next, the method for capturing and storing sounds uttered by an operator into the recorder 13 will be described using FIG. 2. In FIG. 2, first, the elevator car is moved to the floor where an original voice is to be input, and whether the elevator car has arrived at a prescribed location or not as a result of said movement is sensed during elevator car position sensing process 21. When door OPEN (OPEN) button on the operating panel is held down for 5 sec, for example, after the arrival of the elevator car at the prescribed floor is sensed through said position sensing process 21, said operation is acknowledged during door open button continuation judging process 22.

If the door OPEN button is judged to have been held down during door open button continuation judging process 22, Record "S" button on the aforementioned indicator panel starts flashing, and voice input enabling process 23 begins. When the UP button on the operating panel is actuated subsequently, an announcement "Now, ready for recording. Give an audible message by saying 'Floor Number so-and-so' after the beep" is delivered into the elevator car. Once said condition is achieved, and when aforementioned Record "S" button is pressed in order to record the "message regarding floor number," recording starting process 24 begins.

When the recording for said floor has been completed, and the elevator car DOWN button is actuated, recording ending process 25 begins. At this time, an announcement "Press PLAY 'P' button to hear the message just recorded, DELETE 'D' button to delete it, or REDO 'R' button to redo it" is delivered. After these operations have been completed, voice input setting ending process 26 is carried out to end the recording operation. To achieve an ending, door OPEN button is held down again for 5 sec, for example. The aforementioned processes are repeated for each floor to be announced.

The aforementioned recording and playback operations may be carried out interactively like a remote telephone answering system. In addition, because common elements of the elevator control panel are used for the electronic parts for the aforementioned embodiment, cost impact is kept to a minimum.

Second Embodiment

FIGS. 3 through 5 are diagrams for explaining the configuration of a second embodiment of said invention, a diagram for explaining the details of the driving mechanism, and a diagram for explaining the configuration when installed on the operating panel in an elevator car. FIG. 3 shows a Braille information panel 42 provided at a prescribed position on the operating panel of the elevator car. Said Braille information panel has Braille character panel 31 created in the shape of a rectangle in the center, and said panel 31 is configured such that bumps are created mechanically on the panel surface using actuators from below with a driving mechanism to be described later in order to express five or more characters in Braille, for example. Arrow buttons 32 and 33 are provided to the left and the right of rectangular Braille character panel 31, such that when "FORWARD" button 3 is pressed by a passenger, the Braille information displayed on the Braille panel 31 is scrolled forwardly and when "BACKWARD" button 32 is pressed, Braille information is scrolled backwardly.

Furthermore, the installation is such that a judgment of "RESET" is made if neither "BACKWARD" button 32 nor "FORWARD" button 33 is actuated for 30 sec, and Braille character panel 31 returns to the initial screen condition (arrangements of bumps).

As described above, when Braille character panel 31 is provided on the operating panel, not only can the amount of presentable information be increased significantly, but the information can be changed as desired. Furthermore, a Braille character panel may also be provided on an operating panel in the elevator hall.

FIG. 4 is a diagram for explaining the details of the driving mechanism for forming Braille characters on Braille character panel 31. In FIG. 4, Braille character panel 31 is configured with upper and lower panel layers 31*a* and 31*b*, and a fixed space 34 is provided between the layers. Elements 35 represent flexible probes. Said probes 35 are used for Braille character formation and are provided in a multiple number. Probes 35 are provided in such a manner that they pierce through lower panel layer 31*b* to upper panel layer 31*a*. In addition, probes 35 are provided with upper limit stops 36 and lower limit stops 37 where space 34 is provided.

Probes 35 are configured in such a manner that they can be moved vertically by means of actuators 38. Actuators 38 are controlled by means of signals from control 39, whereby probes 35 move up and down in accordance with said control, and resulting Braille characters rise on the surface of upper panel layer 31*a*. Control 39 is operated by means of output processed by information processing part 41 based on input information from information input part 40.

FIG. 5 is a diagram for illustrating how Braille character panel 31 and arrow buttons 32 and 33 are provided on the operating panel of an elevator car.

Figure 6:
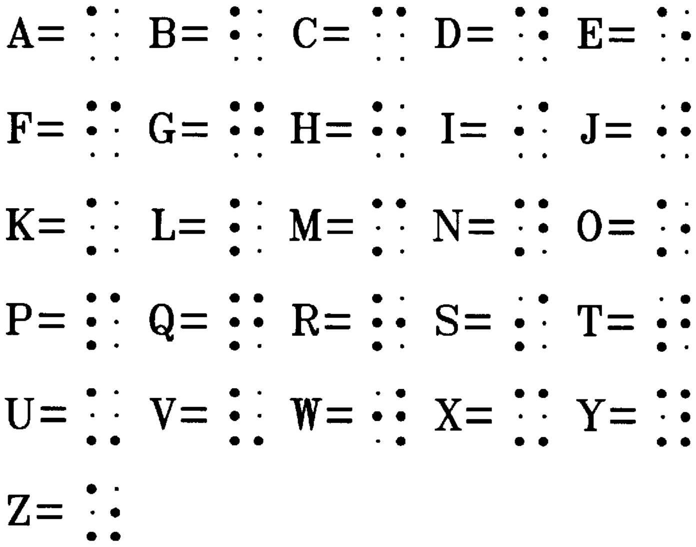
FIG.6 Prior Art
FIG. 6 is a diagram for explaining simple Braille characters.
Figure 7:
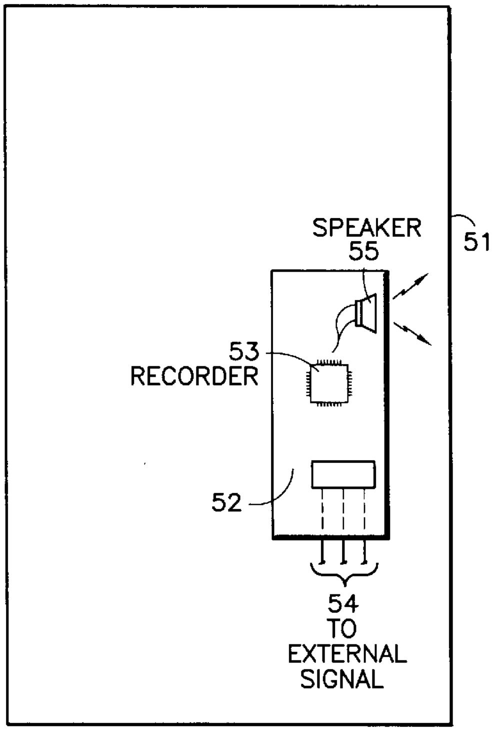
FIG.7 Prior Art
FIG. 7 is a diagram showing an outlined configuration of a typical audible floor call notification system.
Figure 8:
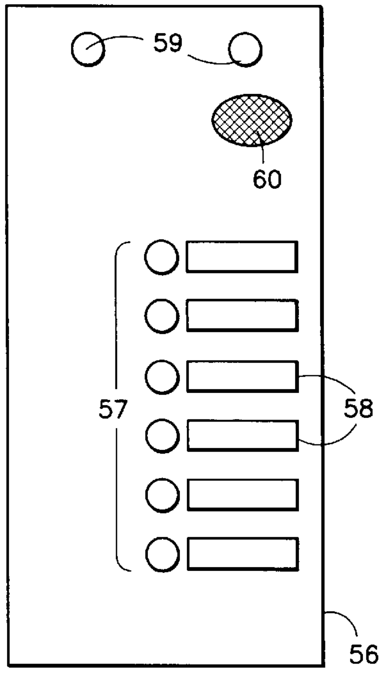
FIG.8 Prior Art
FIG. 8 is a diagram for explaining a typical operating panel in an elevator car.

As shown in FIG. 6, Braille character may be formed from up to 6 dots, as is well known to Braille users.

Because the Braille characters are configured in the manner described above, when information is presented on panel 31 in FIG. 3 using the driving mechanism in FIG. 4, a large amount of information can be presented. Furthermore, signals generated by operating arrow panels 32 and 33 are supplied to information processing part 41 in order to control movement during processing. In addition, information input part 40 and information processing part 41 may be configured using a computer. Furthermore, although it is not illustrated, information in Braille may also be notified through conversion into voice.

As has been described above, the present invention has advantages in that a voice can be converted into arbitrary sounds, and that the amount of Braille information to be conveyed can be increased significantly.

What is claimed is:

1. Audible floor call recording method comprising the steps of:

sensing elevator car position by moving the elevator car to a floor where an original voice is to be input and determining whether the elevator car has arrived at that floor, sensing continuous button pressing, after determining that the elevator car has arrived at the aforementioned floor by the car position sensing process, by judging whether a preselected first button on an operating panel of the elevator car has been held down for a fixed period of time, enabling a voice input process in response to the continuous button pressing sensing step, initiating recording of a message in response to pressing a preselected second button on the aforementioned operating panel, ending said recording of a message when a preselected third button on the aforementioned operating panel is pressed.

2. The method as recited in claim 1, further comprising the step of repeating the sensing, enabling, initiating, and ending steps for each floor for which it is desired to record a unique audible floor call.

* * * * *

UNITED STATES PATENT AND TRADEMARK OFFICE
CERTIFICATE OF CORRECTION

PATENT NO. : 6,696,926 B2
DATED : February 24, 2004
INVENTOR(S) : Yoshinobu Tsukamoto et al.

It is certified that error appears in the above-identified patent and that said Letters Patent is hereby corrected as shown below:

Title page,
Item [75], Inventors, "Yohsinobu Tsukamoto" should read -- Yoshinobu Tsukamoto --; "Toshirou Takahashi" should read -- Toshiro Takahashi --; and "Joji Tanigawa" should read -- Jyoji Tanigawa --.

Signed and Sealed this

Eighth Day of June, 2004

JON W. DUDAS
*Acting Director of the United States Patent and Trademark Office*